July 21, 1953

T DWIGHT ALLER ET AL 2,645,899

HYDROPNEUMATIC PUMPING UNIT

Filed Dec. 6, 1950

INVENTORS:
PAUL E. NOLL and
T. DWIGHT ALLER,
BY: Donald G. Dalton
their Attorney.

FIG. 2ᵃ

NITROGEN BOTTLE
OIL FILTER
OIL COOLER

INVENTORS:
PAUL E. NOLL and
BY: T. DWIGHT ALLER,
Donald G. Dalton
their Attorney.

July 21, 1953  T DWIGHT ALLER ET AL  2,645,899
HYDROPNEUMATIC PUMPING UNIT
Filed Dec. 6, 1950  6 Sheets-Sheet 5

INVENTORS:
PAUL E. NOLL and
BY: T. DWIGHT ALLER,

Donald G. Dalton
their Attorney.

Patented July 21, 1953

2,645,899

UNITED STATES PATENT OFFICE 2,645,899

HYDROPNEUMATIC PUMPING UNIT

T Dwight Aller, San Gabriel, and Paul E. Noll, Pasadena, Calif., assignors to United States Steel Corporation, a corporation of New Jersey Application December 6, 1950, Serial No. 199,504

7 Claims. (Cl. 60—52)

This invention relates to improvements in hydro-pneumatic pumping units for oil wells.

Hydro-pneumatic pumping units commonly comprise a reciprocable fluid operated ram, to which a sucker rod string is connected, a motivating pump for applying hydraulic pressure to the ram, an appropriate system of reversing valves, and a prime mover for driving the pump. It is usual to counterbalance the ram with a force equal approximately to the weight of the rod string plus half the weight of the column of oil pumped from the well and thus to equalize the load on the motivating pump and the prime mover during the up and downstrokes of the ram. Such units have an advantage over the more common walking beam units that they furnish a longer stroke and thus necessitate fewer reversals and impose less severe stresses on the rod string. They also furnish a better control of acceleration, deceleration and speed of the rods.

An object of the present invention is to provide hydro-pneumatic pumping units which are counterbalanced pneumatically and motivated hydraulically through a reversible variable volume pump, thereby furnishing a simplified and very precise control of stroke speeds and acceleration and deceleration.

A further object of the invention is to provide improved pumping units which have the foregoing features and in which the reciprocations of the ram control the output of the reversible variable volume pump through a pilot valve, a pilot operated reversing valve and a servo motor, thereby positively interrelating pump output with the direction of movement and position of the ram.

A further object of the invention is to provide improved pumping units in which the controls of acceleration, speed and deceleration of the ram on its upstroke and downstroke are independent of each other, thereby making possible more efficient operation.

In accomplishing these and other objects of the invention, we have provided improved details of structure, a preferred form of which is shown in the accompanying drawings in which.

The pumping unit of the present invention comprises a ram 10 and a counterbalance 12 which preferably are substantially like those shown in our co-pending application Serial No. 58,714, filed November 6, 1948 (now Patent No. 2,572,748, issued October 23, 1951), except that we have included refinements in the valve which closes off the counterbalance pressure in the event of rod breakage and in the means for lubricating the chain and sprockets.

Figures 1, 10:
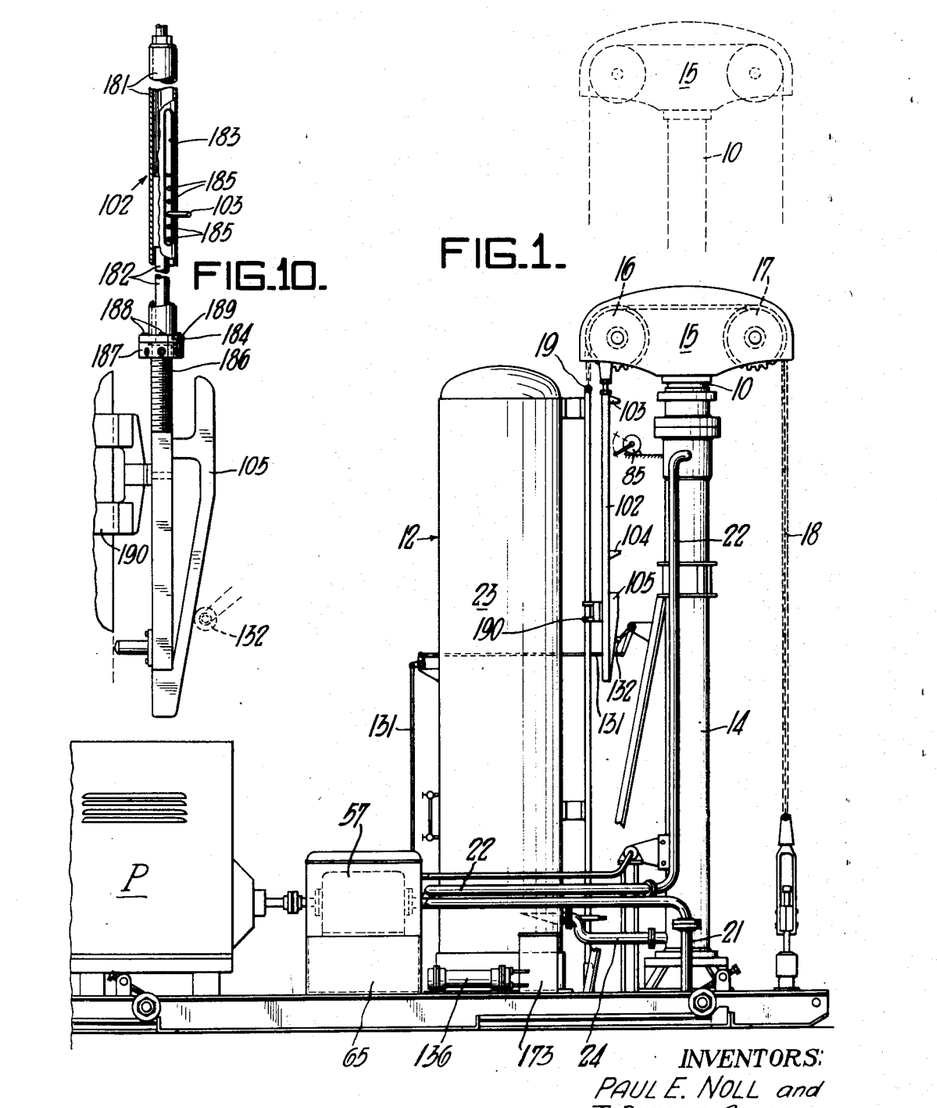
Figure 1 is a side elevational view of an improved pumping unit which embodies features of the present invention.
Figure 10 is a vertical sectional view of a detail of the control rod which operates the servo cam and the pilot valve.
Figure 2A:
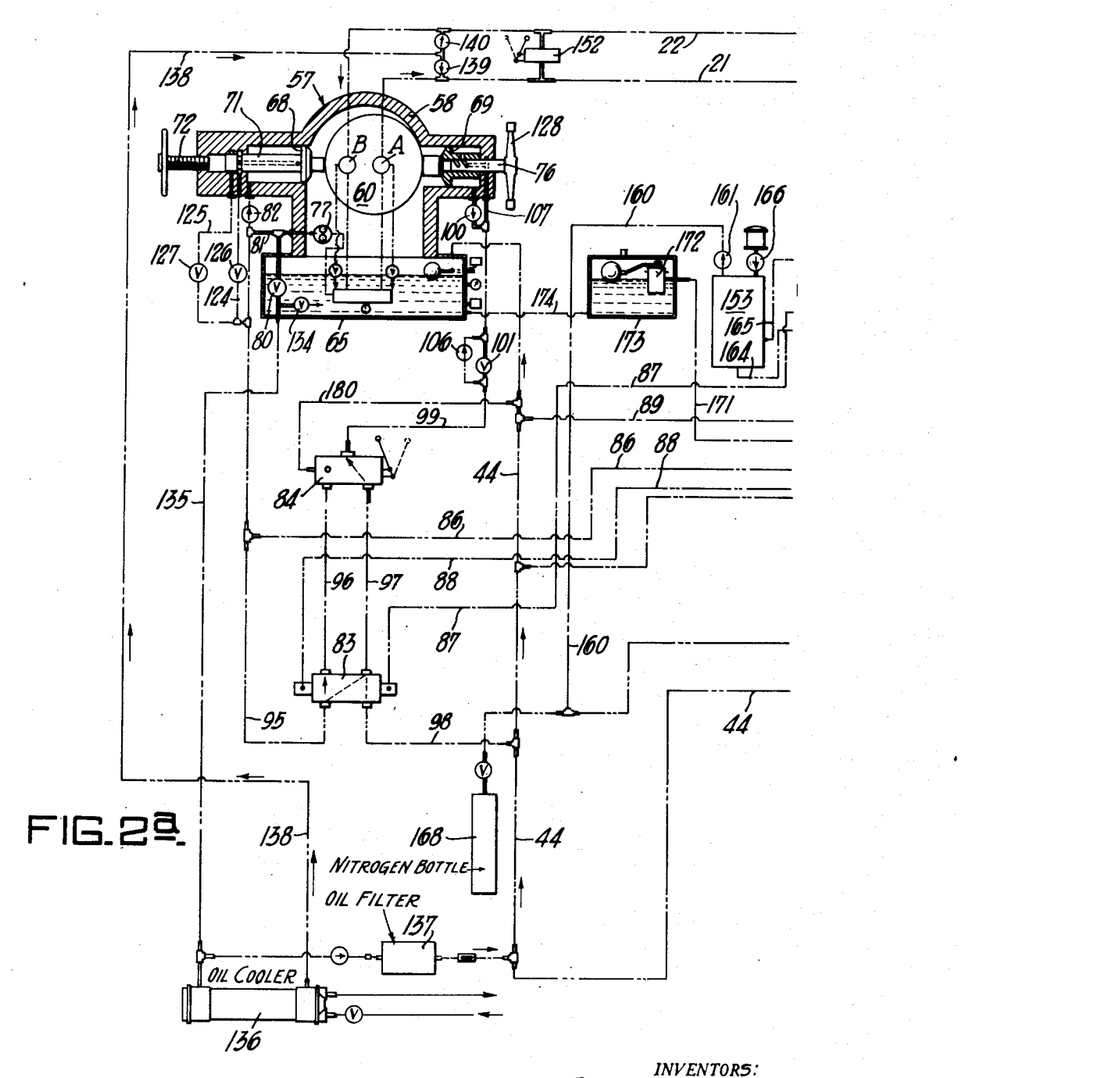
Figures 2a and 2b together are a schematic view of the hydraulic circuit for operating the pumping unit of Figure 1.
Figure 2B:
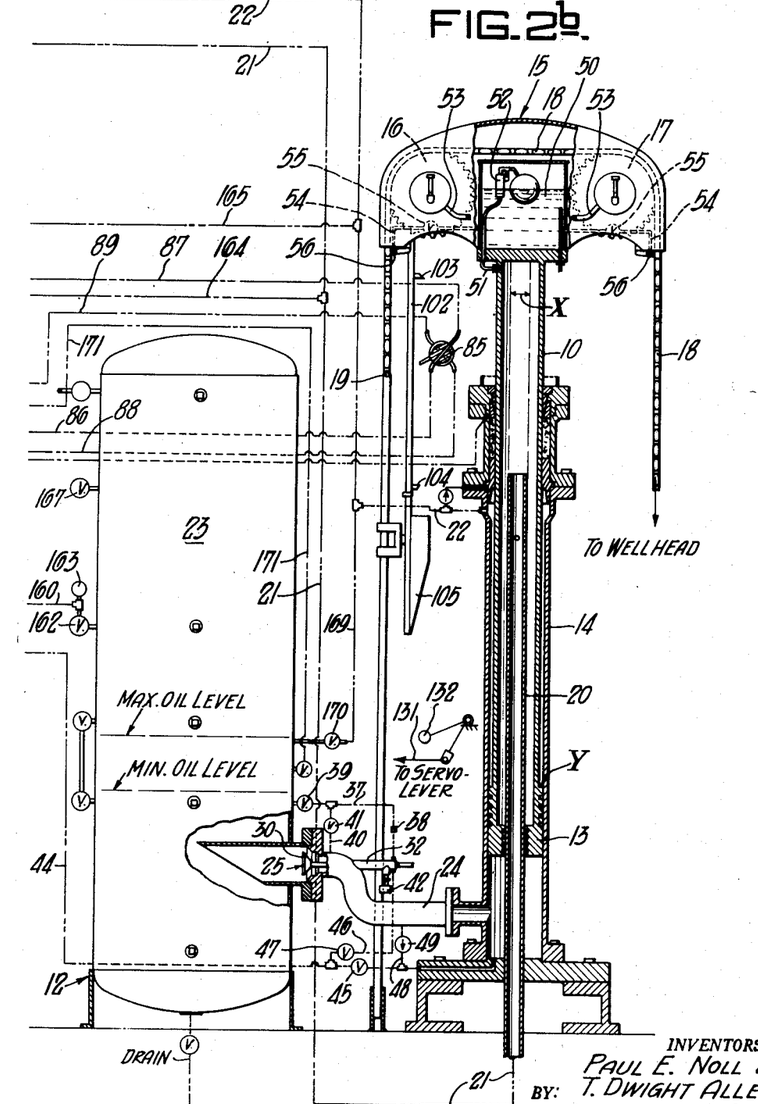

Briefly, the ram includes a piston 13, which is reciprocable in a main cylinder 14, and a sprocket head 15 which carries sprockets 16 and 17 (Figures 1 and 2b). A chain 18 is dead-ended to a rod 19, passes over said sprockets, and is connected at its other end to the sucker rod string. This double reeving of the chain imparts to the rod string a stroke double the length of the ram stroke. Piston 13 has a central bore through which extends an upstanding tube 20. To produce an upstroke of the ram, a motivating pump, hereinafter described, delivers hydraulic fluid into tube 20 via a delivery pipe 21 and such fluid acts on an effective area X of the ram head. To produce a downstroke, the motivating pump delivers fluid into cylinder 14 via a delivery pipe 22 and such fluid acts on an annular effective area Y of piston 13. Preferably the areas X and Y are substantially equal. On each stroke the opposite delivery pipe 21 or 22 serves as a fluid return. Preferably the ends of the cylinder extend beyond the stroke limits of the piston to furnish a dash-pot or cushioning effect, as known in the art. The hydraulic fluid is an oil and is used also to lubricate various parts of the unit, as hereinafter explained.

The counterbalance 12 includes a tank 23 and a pipe 24 which connects the lower portion of said tank and the lower portion of cylinder 14 and normally furnishes free communication. Pipe 24, the lower portion of tank 23, and the portion of cylinder 14 below piston 13 contain hydraulic fluid. The upper portion of tank 23 contains air under pressure. The pressure of this air acts continuously on the bottom of piston 13 and thus tends to lift the ram and the rod string.

Figures 6, 7, 8, 9:
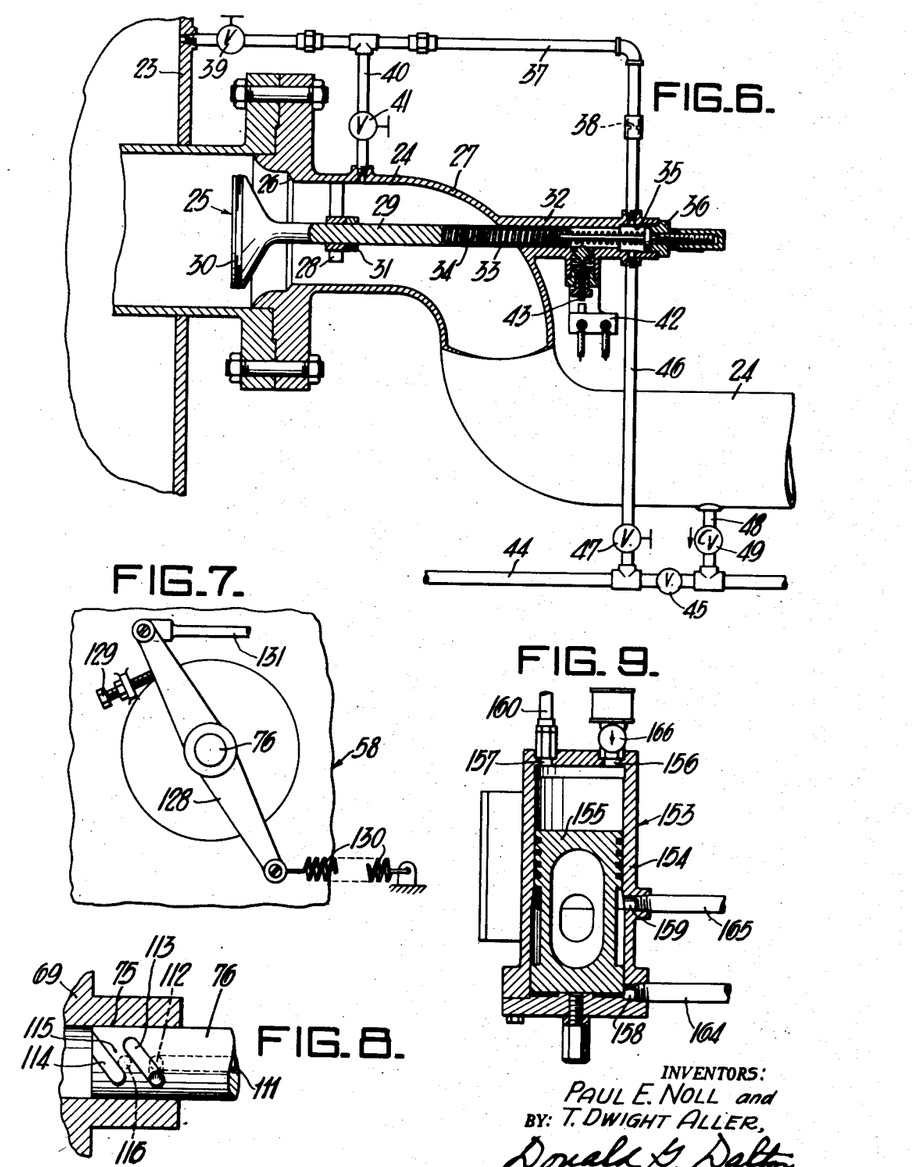
Figure 6 is a vertical sectional view on a larger scale of the connection between the counterbalance tank and the main cylinder.
Figures 7 and 8 are end elevational and vertical sectional views respectively on a larger scale of the servo control mechanism for the motivating pump.
Figure 9 is a vertical sectional view on a larger scale of a preferred construction of air make-up pump.

Pipe 24 contains a valve 25 for closing off counterbalance pressure from the ram cylinder in the event of a sudden release of the load on the ram, such as would occur if either the rod string or chain 18 breaks. Otherwise the counterbalance pressure could drive the ram to the top of the cylinder with a destructive force. Figure 6 shows the details of this valve. Pipe 24 has a valve seat 26 at its juncture with tank 20 and an elbow bend 27 in line with said seat. A guide 28 is supported from the inside wall of the pipe and slidably supports a valve stem 29, which has a valve disk 30 at its end cooperable with seat 26. Stem 29 carries a collar 31 which engages guide 28 to limit the open position of the valve. At its elbow 27 pipe 24 carries an outwardly extending tube 32, within which the back end of valve stem 29 fits closely. This end of stem 29 has a bore 33 which contains a compression spring 34 that normally holds the valve disk unseated. The back end of tube 32 has a counterbore 35 and a closure plug 36. A pipe 37, which has a fixed orifice 38 and a normally closed valve 39, connects tank 23 and counterbore 35. A pipe 40, which has a normally open valve 41, connects pipes 24 and 37 and thus balances the static pressures on opposite ends of valve stem 29 and disk 30.

If there is a sudden release of force on the ram, fluid from tank 23 surges against valve disk 30 and pushes this disk against its seat 26, and thus closes off counterbalance pressure from the ram. Stem 29 forces fluid from tube 32 via pipe 37, orifice 38, pipe 40 and valve 41 into pipe 24. The orifice cushions seating of the valve disk, since it restricts flow of fluid from tube 32 behind the valve stem. Once the disk seats, the counterbalance pressure holds it seated, since the back of the disk and stem no longer are subjected to counterbalance pressure. The valve disk can be unseated for resumption of normal operation by opening valve 39 and thus again applying counterbalance pressure to the back of the valve disk and stem.

In accordance with the present invention, tube 32 carries an electric switch 42 which has a spring pressed plunger 43 extending into the interior of the tube. When valve stem 29 moves into the tube as the valve disk seats, it depresses this plunger and operates the switch. The switch then stops the prime mover which drives the motivating pump, thus immediately halting delivery of hydraulic fluid from the motivating pump to the ram.

A pipe 44, which has a normally closed valve 45, connects cylinder 14 below piston 13 with the main fluid reservoir, hereinafter described. A pipe 46, which has a normally closed valve 47, connects counterbore 35 and pipe 44. Opening of valve 47, after closing valve 41, relieves the static pressure behind valve stem 29 and thus furnishes a means for closing valve 25 manually. A pipe 48 connects pipes 24 and 44 and contains a check valve 49 which allows flow only from the former to the latter. This pipe furnishes an inlet for counterbalance fluid to cylinder 14 when the ram overtravels pipe 24.

Also in accordance with the present invention, the ram head 15 carries a lubricant tank 50 (Figure 2b). A pipe 51, which contains a float valve 52, bleeds a small amount of hydraulic fluid from the interior of the ram into said tank. The fluid level in said tank controls opening and closing of said float valve and thus controls the admission of more fluid. Lubricant flows gravitationally from said tank through pipes 53 to the bearings of sprockets 16 and 17. Lubricant also flows gravitationally from said tank through pipes 54 and needle valves 55 to brushes 56 at the ends of said pipes. These brushes contact chain 18 and thus lubricate it.

Figure 3:
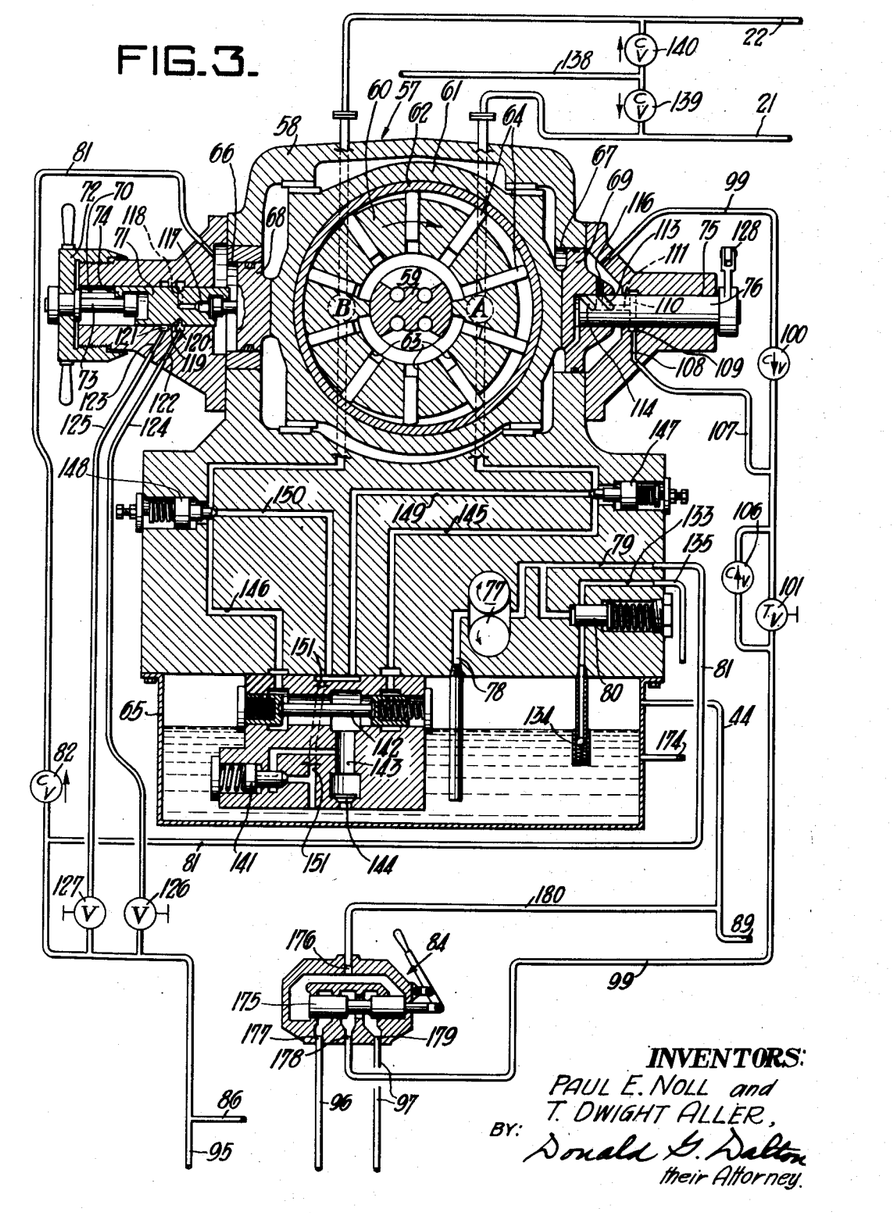
Figure 3 is a somewhat schematic view on a larger scale of a preferred construction of motivating pump and manual reversing valve.

In accordance with the present invention, the unit has a motivating pump 57 which is of the reversible variable volume type. Figure 2a illustrates this pump schematically and Figure 3 illustrates a preferred construction somewhat more in detail. The pump illustrated has a casing 58, a pintle 59 fixed in said casing, a cylinder block 60 rotatable around said pintle, a slide block 61 slidable across said casing, and a thrust ring 62 within said slide block and surrounding said cylinder block. The cylinder block contains a plurality of radial cylinders 63 which have pistons 64. The pintle has two delivery ports A and B connected respectively to delivery pipes 21 and 22. The pump has a main reservoir 65. A prime mover P (Figure 1) rotates the cylinder block clockwise as viewed in Figure 3. When the slide block is to the right of center, the pump delivers fluid through port A, delivery pipe 21 and tube 20 to the inside of ram 10 and the ram makes an upstroke. When the slide block is centered, there is no delivery. When the slide block is to the left of center, the pump delivers fluid through port B and delivery pipe 22 into cylinder 14 and the ram makes a downstroke. The farther the slide block is off center in either direction, the greater the delivery and the greater the speed with which the pump propels the ram. Inasmuch as pumps of this construction per se are well known, no more detailed description is deemed necessary.

For positioning the slide block 61 in the pump casing 58, the casing has a cylinder 66 at the left and a cylinder 67 at the right (Figure 3). The slide block has positioning pistons 68 and 69 at opposite ends slidably received in said cylinders. Piston 69 at the right has a greater facial area than piston 68 at the left. Beyond cylinder 66 at the left the casing has a bore 70 which contains a slidable stem 71 coupled with piston 68. A cap 72 closes the end of bore 70 and carries an inwardly projecting headed spindle 73. The outer end of stem 71 carries a hook device 74 which engages over the head of said spindle. This engagement limits the extreme position to which the slide block can move to the right, and this position can be adjusted by moving cap 72. Beyond cylinder 67 at the right the casing has a bore 75 which contains a rotatable servo shaft 76 which limits the extreme position to which the slide block can move to the left in a manner hereinafter explained.

The pump casing 58 contains an auxiliary gear pump 77 driven by the prime mover for supplying pilot pressure to the various pilot operated parts, including cylinders 66 and 67. The pump casing has a suction duct 78 from reservoir 65 to auxiliary pump 77, and an outlet duct 79 from the auxiliary pump. Duct 79 has a connection to a relief valve 80 which holds the pressure in this duct to a predetermined value (e. g. 130 p. s. i.), designated "high pilot pressure." A pipe 81, which contains a check valve 82, connects duct 79 and cylinder 66 so that piston 68 on the left is always subject to high pilot pressure.

Figure 4:
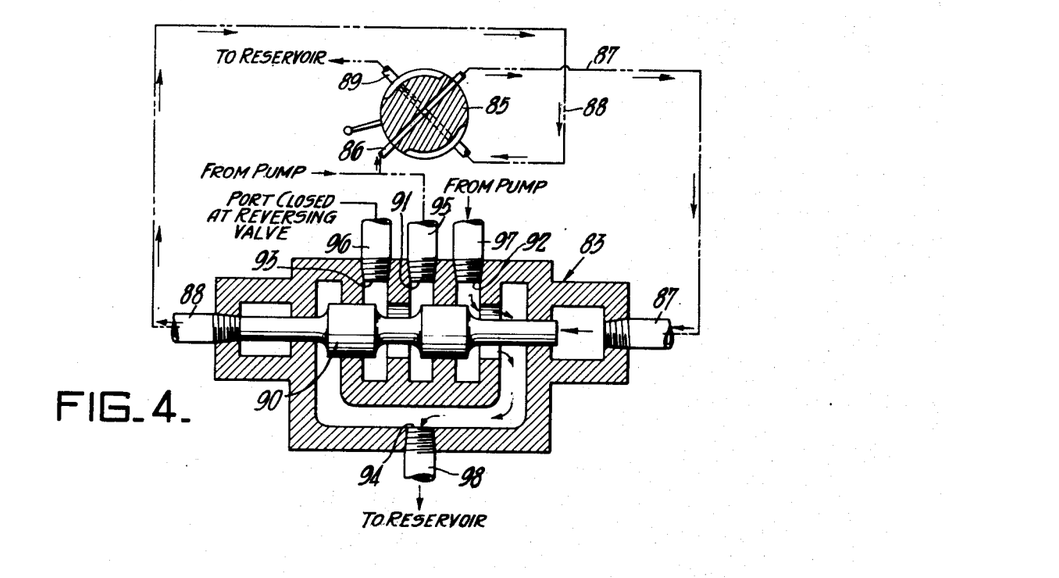
Figures 4 and 5 are somewhat schematic views on a larger scale of the pilot valve and pilot operated reversing valve showing respectively their positions for an upstroke and for a downstroke of the ram.
Figure 5:
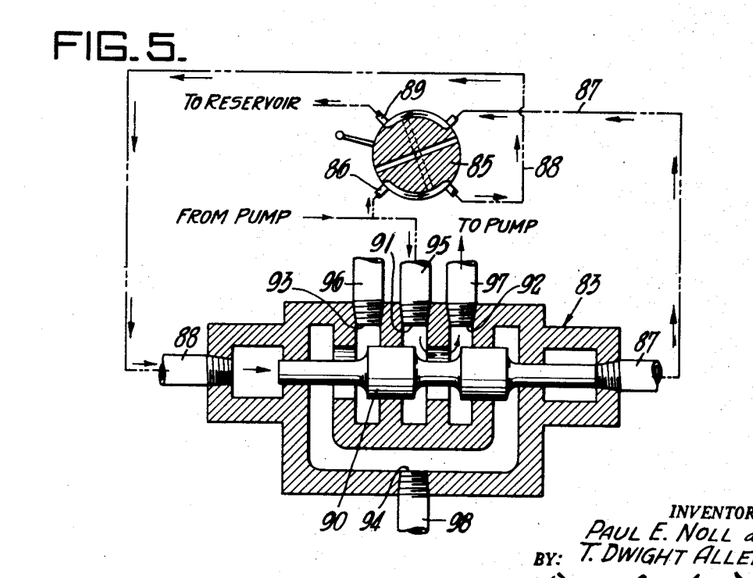

The unit comprises a pilot operated reversing valve 83 (Figures 2a, 4 and 5), a manual reversing valve 84 (Figures 2a and 3), and a pilot valve 85 (Figures 2b, 4 and 5). A pipe 86 connects pipe 81 and pilot valve 85. Figure 4 illustrates the position of valves 83 and 85 when the motivating pump is delivering fluid through pipe 21 and the ram is making an upstroke. In this position pilot valve 85 connects pipe 86 which comes from the auxiliary pump with a pipe 87 which extends to the right end of the pilot operated reversing valve 83. At the same time the pilot valve connects a pipe 88, which extends from the left end of said reversing valve, with a pipe 89 which connects with pipe 44 and thence to reservoir 65. The pilot operated reversing valve 83 contains a reciprocable valve spool 90, and it has four ports 91, 92, 93 and 94. A pipe 95 connects pipe 86 from the auxiliary pump with port 91. A pipe 96 connects port 93 with the manual reversing valve 84 hereinafter described. A pipe 97 connects port 92 with said manual reversing valve. A pipe 98 connects port 94 with pipe 44 and thence with reservoir 65.

In the position of the parts just described, pilot valve 85 directs fluid at high pilot pressure from auxiliary pump 77 to the right end of valve spool 90 and relieves the left end so that this spool is all the way to the left. The pilot operated reversing valve connects pipe 95 with pipe 96. Normally the manual reversing valve blocks off pipe 96 so there is no flow through this part of the circuit. A pipe 99, which contains a check valve 100 and an adjustable throttling valve 101, connects cylinder 67 and the manual reversing valve, which normally connects this pipe with pipe 97. The pilot operated reversing valve also connects pipe 97 with pipe 98 and thus relieves cylinder 67. Therefore the pressure in cylinder 66 keeps slide block 61 of the motivating pump to the right to the limit which engagement of hook device 74 with spindle 73 permits, which as already explained is the position in which the pump delivers fluid through pipe 21 and the ram makes an upstroke.

Sprocket head 15 carries a depending control rod 102 to which are adjustably affixed an upper pilot valve trip 103, a lower pilot valve trip 104, and a servo linkage cam 105 (Figures 1 and 2b). Adjustment of the position of these parts on the rod determines the reversal points. Since the ram moves relatively slowly it is possible to adjust these parts while the ram is in motion, and thus to obtain a very precise control of the bottom reversal point. When the ram completes its upstroke, the lower trip 104 trips pilot valve 85 to a position in which it connects pipe 86 with pipe 88 and also connects pipe 87 with pipe 89. Figure 5 shows the position the pilot valve and pilot operated reversing valve now assume. The left end of spool 90 of the pilot operated reversing valve is subjected to hydraulic fluid under high pilot pressure and the right end is relieved, whereupon this spool shifts to the right. Fluid under high pilot pressure now enters the pilot operated reversing valve through port 91, discharges through port 92, passes through manual reversing valve 84, pipe 99, a check valve 106, which shunts throttling valve 101, and through a pipe 107, which connects pipe 99 and cylinder 67, shunting check valve 100 (Figure 3). Ports 93 and 94 of the pilot operated reversing valve also are connected, but normally there is no fluid circulation through these ports.

Pump casing 58 has a duct 108 to which pipe 107 is connected and which extends to an annular groove 109 in the wall of bore 75. This groove surrounds servo shaft 76, hereinbefore referred to. The servo shaft has a radial duct 110, which communicates with groove 109, a longitudinal duct 111, which communicates with said radial duct, and a second radial duct 112, which communicates with said longitudinal duct (Figure 8). The servo shaft has two spiral grooves 113 and 114 and a spiral land 115 between them. Groove 113 is closed at both ends, but at its mid-portion communicates with radial duct 112. Groove 114 is closed at one end and communicates with the interior of the pump casing at the other end. Piston 69 has a radial duct 116. When cylinder 67 is relieved and slide block 61 and piston 69 are all the way to the right, duct 116 communicates with groove 113. When valve 83 admits hydraulic fluid under high pilot pressure to pipe 107, such fluid enters cylinder 67 via duct 108, annular groove 109, ducts 110, 111, and 112, spiral groove 113 and duct 116. Since piston 69 has a greater facial area than piston 68, the slide block moves to the left. During such movement fluid escapes from cylinder 66 via means hereinafter described. The movement continues until duct 116 has moved to a position in which land 115 closes it off.

It is seen that rotation of servo shaft 76 clockwise, as viewed in Figure 7, in effect shifts grooves 113 and 114 and land 115 to the right, and rotation counterclockwise in effect shifts them to the left. If the servo shaft is rotated clockwise, thus moving groove 114 to the right into communication with duct 116, cylinder 67 is relieved to the interior of the pump casing and high pilot pressure on piston 68 forces the slide block to the right. If the servo shaft is rotated counterclockwise, thus moving groove 113 to the left into communication with the duct 116, more fluid is admitted to cylinder 67 and forces the slide block to the left. The net effect is that as long as this cylinder is subjected to pressure, duct 116 in piston 69 follows land 115. The position of rotation of the servo shaft thus determines the position which the slide block occupies and, whenever the servo shaft rotates clockwise or counterclockwise, the slide block moves correspondingly to the right or left.

The means through which fluid escapes from cylinder 66 as the slide block 61 moves to the left include longitudinal and radial ducts 117 and 118 and an annular groove 119 in spindle 71, a pair of annular grooves 120 and 121 in the wall of bore 70 in the pump casing, a pair of ducts 122 and 123 communicating with the latter annular grooves, and pipes 124 and 125 communicating with the latter ducts and extending to pipe 95. Pipe 124 has an adjustable throttling valve 126 and pipe 125 an adjustable throttling valve 127. When the slide block is in its extreme position to the right, annular groove 119 in stem 71 communicates with annular groove 120, duct 122 and pipe 124. The throttling valve 126 thus controls the rate of escape of fluid from cylinder 66 as the slide block moves from this position to its centered position and thereby controls the rate of deceleration of the ram as it approaches the top of its upstroke. As the slide block passes its centered position, annular groove 119 in stem 71 passes from communication with annular groove 120 into communication with annular groove 121 and with duct 123 and pipe 125. The throttling valve 127 thus controls the rate of escape of fluid from cylinder 66 as the slide block moves from its centered position to its position at the extreme left and thereby controls the rate of acceleration of the ram as it starts its downstroke.

The outer end of servo shaft 76 carries a lever 128 (Figure 7). Pump casing 58 has an adjustable stop 129 with which lever 128 is engageable, and a spring 130 urges the lever into engagement with this stop. This stop thus limits the counterclockwise rotation of the servo shaft, and therefore limits the extreme position to which the slide block can move to the left. A linkage 131 is connected to lever 128 and extends to another lever 132 which is positioned to cooperate with cam 105 on control rod 102 (Figures 1 and 2b). As the ram approaches the end of its downstroke, cam 105 engages lever 132 and thus turns this lever counterclockwise, as viewed in Figure 1, and lever 128 clockwise, as viewed in Figure 7. Clockwise rotation of the latter lever turns servo shaft 76 clockwise and, as already explained, in effect shifts its land 115 to the right. Thereupon slide block 61 moves to the right, the pump output diminishes, and the ram decelerates. The position and shape of cam 105 control the rate of deceleration.

Shortly the upper pilot valve trip 103 on control rod 102 trips pilot valve 85 and the parts return to the position first described and another upstroke begins. Throttling valve 101 controls the rate of escape of fluid from cylinder 67 and thus controls the rate of acceleration of the ram at the start of its upstroke.

As already described, the output from gear pump 77 passes into a duct 79 which communicates with a relief valve 80. The excess fluid which discharges through this relief valve flows into a duct 133 which has a second relief valve 134 (Figure 3). This latter relief valve regulates the pressure in duct 133 to a predetermined value (e. g. 100 p. s. i.) designated "medium pilot pressure." Fluid under medium pilot pressure flows from duct 133 through a pipe 135 to an oil cooler 136 and an oil filter 137 connected in parallel (Figure 2a). Fluid discharges from the filter into pipe 44 which returns it to the main reservoir 65.

Fluid discharges from the cooler through a pipe 138 which extends to two check valves 139 and 140 (Figures 2a and 3). Check valve 139 connects pipe 138 and the pump delivery pipe 21, while check valve 140 connects pipe 138 and the other pump delivery pipe 22. These check valves introduce fluid to whichever of the delivery pipes is acting as a return from the ram to the motivating pump and thus supercharge the pump. A back pressure relief valve 141, hereinafter described, maintains the fluid in the low pressure side of the pump and in pipe 138 at a predetermined pressure (e. g. 60 p. s. i.) designated "low pilot pressure."

The motivating pump is equipped also with a suction valve which has a spring centered spool 142, a passage 143 extending into the main reservoir 65, and a check valve 144 closing said passage against return of fluid to the reservoir (Figure 3). The pump casing has a duct 145, which extends from its delivery port A to the right end of valve spool 142, and a duct 146, which extends from its delivery port B to the left end of this valve spool. When the pump delivers fluid from port A, fluid pressure in duct 145 forces the valve spool to the left and opens duct 146 so that fluid can be supplied to port B, which is now the low pressure or suction side of the pump, from the reservoir via check valve 144, passage 143 and duct 146. The reverse takes place when the pump delivers fluid from port B. The back pressure relief valve 141, hereinbefore referred to, communicates with passage 143 and with whichever of ducts 145 or 146 is open thereto.

The pump casing also contains relief valves 147 and 148 in ducts 145 and 146 respectively. Ducts 149 and 150 extend from said relief valves to a common duct 151, and thence to the main reservoir 65. If the pressure in the high pressure or delivery side of the pump is excessive, fluid escapes via the relief valve on this side and its associated ducts.

A start-stop valve 152 is connected across delivery pipes 21 and 22 (Figure 2a). During normal operation of the unit this valve is closed. When it is open, it short circuits the delivery pipes and thus stops delivery of fluid to the ram.

The unit has an air make-up pump 153, the details of which are shown in Figure 9. Pump 153 includes a cylinder 154 which contains a reciprocable piston 155. Cylinder 154 has an air intake port 156, an air discharge port 157, and power fluid ports 158 and 159. A pipe 160, which contains a check valve 161 (Figure 2a), a normally open valve 162 (Figure 2b) and a pressure gauge 163 (Figure 2b), connects port 157 and counterbalance tank 23. A pipe 164 connects the power fluid port 158 with delivery pipe 21 and a pipe 165 connects the power fluid port 159 with delivery pipe 22. The air intake port 156 is equipped with a check valve 166. When the motivating pump 57 delivers fluid through pipe 21, some fluid enters cylinder 154 of pump 153 via pipe 164 and forces piston 155 upwardly and discharges the air in the cylinder through pipe 160 into the counterbalance tank. When the motivating pump delivers fluid through pipe 22, some fluid enters cylinder 154 via pipe 165 and forces the piston back and allows air to flow into the cylinder via air intake 156. The counterbalance tank has a relief valve 167 to protect it against excessive pressures (Figure 2b). Preferably a nitrogen or compressed air bottle 168 is connected to pipe 160 to furnish a pressure source for initially charging the counterbalance tank (Figure 2a).

For introducing hydraulic fluid to the counterbalance tank, the unit has a pipe 169 which is connected to delivery pipe 22 and contains a normally closed valve 170 (Figure 2b). When valve 170 is open, the motivating pump delivers hydraulic fluid to the counterbalance tank via pipes 22 and 169.

A pipe 171 is connected to the counterbalance tank to prevent the accumulation of excessive fluid in this tank and thus depriving the main reservoir. The tendency is for fluid to build up in the tank because of leakage past piston 13. Pipe 171 extends to a float operated control valve 172 in a fluid level tank 173. A return pipe 174 returns fluid from said tank to the main reservoir 65. As the fluid level in reservoir 65 drops, there is a corresponding drop in the fluid level in tank 173. Such a drop opens valve 172, whereupon air pressure in the counterbalance tank forces fluid through pipe 171 into tank 173.

Figure 3 shows the manual reversing valve 84 in the position it occupies during normal operation of the unit. In this position the valve serves merely as a conduit connecting pipes 97 and 99.

This valve has a spool 175 and ports 176, 177, 178 and 179. A pipe 180 connects port 176 and pipe 44 which extends to the main reservoir 65. This connection serves to return fluid which leaks around spool 175 to the reservoir. Pipe 96 is connected to port 177, pipe 99 to port 178, and pipe 97 to port 179. The normal position of spool 175 is to the right in the valve housing.

If the operator desires to reverse the direction of movement of the ram during either stroke, he simply moves spool 175 of the manual reversing valve to the left. The valve then connects pipes 96 and 99 and blocks off pipe 97. If the ram is making an upstroke at the moment, the gear pump 77 commences delivering fluid under high pilot pressure through pipe 96, ports 177 and 178, pipe 99 and thence to cylinder 67. Thereupon the slide block 61 of the motivating pump moves to the left, the pump reverses its delivery and the ram starts moving downwardly. If the ram is making a downstroke at the moment, cylinder 67 is relieved via pipe 99, ports 178 and 177, pipe 96, ports 93 and 94 of the pilot operated reversing valve 83, and pipes 98 and 44 to the main reservoir 65. Thereupon slide block 61 moves to the right, the pump reverses its delivery, and the ram starts moving upwardly.

Figure 10 shows in detail a preferred construction of control rod 102 for enabling the servo cam 105 and upper trip 103 to be adjusted vertically while the unit is operating. Said control rod includes an outer tubular element 181, which contains a telescoping spindle 182. This tubular element has a slot 183 in its upper portion and a flange 184 at its lower end. Spindle 182 has a series of tapped openings 185 adjacent its upper end. The upper trip finger 103 can be fixed in any of said taps and extends through slot 183. The spindle has a screw-threaded section 186 which carries a nut 187. A plurality of screws 188 normally hold nut 187 against flange 184. A set screw 189 in tubular element 181 also assists in holding the spindle in position. The lower end of the spindle carries the servo cam 105 and also a guide 190 which slides up and down on the dead end rod 19.

It is highly desirable that the clearance in the subsurface pump be as small as practicable. The position of cam 105 and trip 103 determines the bottom reversal point and therefore determines this clearance. Their position can be adjusted by loosening screws 188 and set screw 189 and then rotating nut 187 with respect to spindle 182. Since the control rod moves slowly at only about half the speed of the polished rod, this adjustment can be made while the unit is in operation.

Operation

The operation of a hydro-pneumatic pumping unit constructed as just described can be summarized as follows:

When the ram 10 is making an upstroke, the reversible variable volume motivating pump is delivering hydraulic fluid through delivery pipe 21 to the ram. The slide block 61 of this pump is to the right. When the ram nears completion of its upstroke, the lower pilot valve trip 104 trips pilot valve 85. The pilot valve changes the direction of application of pilot pressure to the pilot operated reversing valve 83. Pilot pressure from the gear pump 77, acting through the servomotor shaft 76, moves the slide block 61 first to the center and then to the left. Thereupon the motivating pump starts delivering fluid through pipe 22 and the ram starts a downstroke.

When the ram nears completion of its downstroke, cam 105 engages lever 132 and rotates the servo shaft clockwise. Such rotation moves the slide block toward the center and the delivery from the motivating pump diminishes, thus decelerating the ram. Then the upper pilot valve trip 103 trips pilot valve 85, which again changes the direction of application of pilot pressure to the pilot operated reversing valve 83. Thereupon the right side of the slide block is relieved and the slide block moves all the way to the right and the ram starts another upstroke.

It is seen that position of hook device 74 controls the speed of the ram during its upstroke, since engagement of stem 71 with said hook device limits the extreme position to which slide block 61 can move to the right. The position of the stop 129 for lever 128 controls the speed of the ram during its downstroke, since this stop limits the extent servo shaft 76 can rotate counterclockwise and hence the distance to the left its land 115 can move. The opening of throttling valve 126 controls deceleration of the ram at the top of its upstroke. The opening of throttling valve 127 controls acceleration of the ram at the start of its downstroke. The configuration and position of adjustment of cam 105 controls deceleration of the ram at the bottom of its downstroke. The opening of throttling valve 101 controls acceleration of the ram at the start of its upstroke. The position of the trips on the control rod controls the reversal points. Therefore all these controls are entirely independent of each other and any can be adjusted without affecting the others.

The control rod 102 which operates the pilot valve and the servomotor is carried by the ram and always moves therewith. This arrangement positively interrelates operation of the motivating pump with the position and direction of movement of the ram, as distinguished from an arrangement in which the motivating pump regulates its own reversals.

While we have shown and described only a preferred embodiment of the invention, it is apparent that modifications may arise. Therefore, we do not wish to be limited to the disclosure set forth but only by the scope of the appended claims.

We claim:

1. A hydro-pneumatic pumping unit comprising a cylinder, a ram carried for reciprocable movement in said cylinder, means for connecting a string of sucker rods to said ram, pneumatic means for applying a counterbalancing force to said ram, a reversible variable volume motivating pump having delivery pipes connected to said cylinder for supplying hydraulic fluid to reciprocate said ram and including a slide block having an off-center position in which said motivating pump delivers fluid to said cylinder to produce an upstroke of the ram, a centered position in which said motivating pump delivers no fluid, and a second off-center position in which said motivating pump delivers fluid to said cylinder to produce a downstroke of the ram, the distance off-center of said slide block in either direction determining the volume of fluid which said motivating pump delivers, positioning pistons and cylinders at opposite ends of said slide block, a pilot circuit connected to said positioning cylinders and including an auxiliary pump for supplying hydraulic fluid thereto under pilot pressure, one of said positioning cylinders being of smaller cross-sectional area than the other and being subjected constantly to fluid under pilot pressure, a pilot operated reversing valve in said pilot circuit for controlling the application of fluid under pilot pressure to the other positioning cylinder, a servo motor for positioning the piston in this other positioning cylinder when the cylinder is subjected to pilot pressure, escape pipes from both said positioning cylinders, a pilot valve in said pilot circuit for controlling said reversing valve, a linkage for controlling said servo motor, means on said ram for shifting said pilot valve at the ends of the ram strokes and thereby moving said reversing valve to its other off-center position, means on said ram for operating the linkage of said servo motor on the ram downstroke in advance of said pilot valve and thereby decelerating the ram, and means in said escape pipes controlling escape of fluid therethrough and thereby controlling deceleration of the ram at the end of its upstroke and acceleration at the beginning of both strokes.

2. A hydro-pneumatic pumping unit as defined in claim 1 in which said positioning cylinder of smaller cross-sectional area has two escape pipes, one of which controls escape of fluid while said slide block moves from its off-center position to its centered position and the other of which controls escape of fluid while said slide block moves from its centered position to its other off-center position, thereby furnishing independent controls for deceleration of the ram at the end of its upstroke and for acceleration of the ram at the beginning of its downstroke.

3. A hydro-pneumatic pumping unit as defined in claim 1 in which there is a manual reversing valve between said pilot operated reversing valve and said motivating pump, actuation of said manual reversing valve reversing said motivating pump before the ram reaches the end of its stroke.

4. A hydro-pneumatic pumping unit comprising a cylinder, a ram carried for reciprocable movement in said cylinder and having a sprocket head at its upper end and a pair of sprockets rotatably mounted in said sprocket head, a chain having one of its ends dead-ended, passing over said sprockets and adapted to be connected at its other end to a sucker rod string, means for applying a counterbalancing force to said ram, a motivating pump having delivery pipes connected to said cylinder for supplying hydraulic fluid to reciprocate said ram, a lubricant tank in said sprocket head, a conduit to deliver hydraulic fluid from said ram to said lubricant tank, a float valve regulating the level of fluid in said tank, and conduits to lubricate said chain and said sprockets gravitationally from said lubricant tank.

5. A hydro-pneumatic pumping unit comprising a cylinder, a ram carried for reciprocable movement in said cylinder, means for connecting a string of sucker rods to said ram, pneumatic means for applying a counterbalancing force to said ram, a valve for automatically shutting off this counterbalancing force in the event of a sudden release of the load on the ram, a motivating pump having delivery pipes connected to said cylinder for supplying hydraulic fluid to reciprocate said ram, and electric switch means operated by said valve for automatically stopping said motivating pump when said valve shuts off the counterbalancing force from said ram.

6. In a hydro-pneumatic pumping unit which includes a cylinder, a ram carried for reciprocable movement in said cylinder, means for connecting a string of sucker rods to said ram, means for counterbalancing said ram, a motivating pump for delivering hydraulic fluid to said cylinder, and valves and a cam operated linkage for controlling the output of said motivating pump, the combination with said ram of a control rod which depends therefrom and comprises a tubular element having a slot, a spindle telescoping into said tubular element and carrying a trip finger which extends through said slot for operating one of said valves and a cam adjacent its lower end for operating said linkage, and means adjustably fixing said spindle to said tubular element to permit relative adjustment while the unit is in operation to vary the bottom reversal point of said ram.

7. In a hydro-pneumatic pumping unit which includes a cylinder, a ram carried for reciprocable movement in said cylinder, means for connecting a string of sucker rods to said ram, means for counterbalancing said ram, a motivating pump for delivering hydraulic fluid to said cylinder, and valves and a cam operated linkage for controlling the output of said motivating pump, the combination with said ram of a control rod which depends therefrom and comprises a tubular element having a slot in its upper portion and a flange on its lower end, a spindle telescoping into said tubular element and carrying a trip finger which extends through said slot for operating one of said valves and a cam adjacent its lower end for operating said linkage, said spindle having a screw-threaded section, a nut movably carried on said screw-threaded section and abutting said flange, and screw means releasably fixing said spindle in adjusted position with respect to said tubular element, said spindle being adjustable on release of said screw means and movement of said nut while the unit is in operation to vary the bottom reversal point of said ram.

T DWIGHT ALLER.
PAUL E. NOLL.

References Cited in the file of this patent

UNITED STATES PATENTS

| Number | Name | Date |
|---|---|---|
| 1,619,474 | Hubbard | Mar. 1, 1927 |
| 2,027,104 | Kahr et al. | Jan. 7, 1936 |
| 2,093,690 | Wiedmann | Sept. 21, 1937 |
| 2,114,005 | Tyler | Apr. 12, 1938 |
| 2,227,814 | Tyler | Jan. 7, 1941 |
| 2,273,721 | Muller | Feb. 17, 1942 |
| 2,331,046 | Robinson | Oct. 5, 1943 |
| 2,367,248 | Vickers | Jan. 16, 1945 |
| 2,432,305 | Geiger | Dec. 9, 1947 |
| 2,443,301 | Conabee | June 15, 1948 |
| 2,564,285 | Smith | Aug. 14, 1951 |